United States Patent [19]
Hobbs

[11] 3,827,209
[45] Aug. 6, 1974

[54] DUCT-GRILLE CONNECTION CLIP

[76] Inventor: James R. Hobbs, 5303 Glenmont, Houston, Tex. 77036

[22] Filed: May 19, 1971

[21] Appl. No.: 144,848

[52] U.S. Cl. ................. 52/760, 24/73 B, 248/2/24
[51] Int. Cl. .......................................... A446 21/00
[58] Field of Search ............ 52/285, 483, 484, 474, 52/361, 362, 512; 287/189.35, 189.36 A, 20.94, 20.95, 20.92 J, 20.92 W; 248/300; 24/73 B, 81 BF

[56] References Cited
UNITED STATES PATENTS

| 1,762,311 | 6/1930 | Schwab | 24/73 B |
| 2,351,525 | 6/1944 | Leary | 52/285 |
| 3,024,937 | 3/1962 | Kooi | 248/300 X |
| 3,192,671 | 7/1965 | Smith | 52/285 X |

FOREIGN PATENTS OR APPLICATIONS

| 204,855 | 0/0000 | Australia | 287/20.92 W |
| 496,700 | 10/1953 | Canada | 24/73 B |

*Primary Examiner*—Jordan Franklin
*Assistant Examiner*—Wayne L. Shedd
*Attorney, Agent, or Firm*—James F. Weiler; Paul L. De Verter, II

[57] ABSTRACT

A clip for attachment to a fiberglass, or similar ventilation duct, which provides a means for securing the duct to structural studs or plates, a ledge for use as a sheetrock or other wall covering abutment, and a perforated face for attachment of the grille to the duct.

1 Claim, 2 Drawing Figures

PATENTED AUG 6 1974
3,827,209
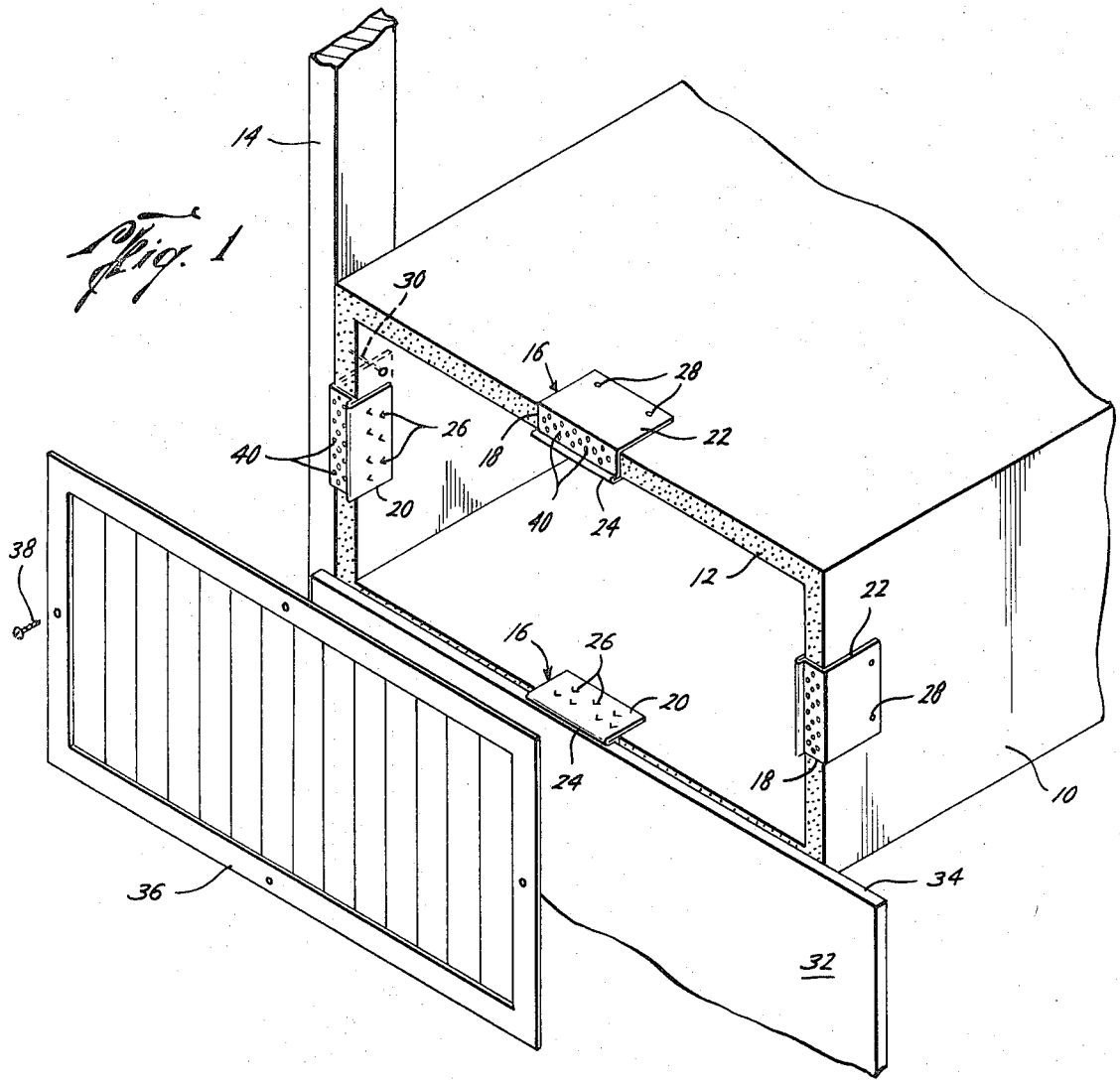
Fig. 1
Fig. 2
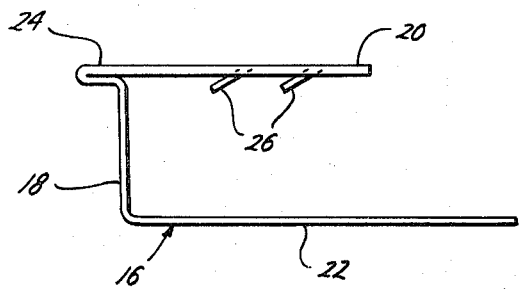
James R. Hobbs
INVENTOR.
BY Paul L. DeVerter II
ATTORNEYS

DUCT-GRILLE CONNECTION CLIP

BACKGROUND OF THE INVENTION

The present invention generally relates to a clip for use with heating and air conditioning (ventilation) ducts of the type including a fiberglass, or similar, insulation lining. More particularly, the present invention provides a means for securing the duct to the building structure, an abutment for the wall covering material, a means for securing the clip to the duct, and a means for securing the grille to the duct. In addition, the clip, when used to secure the duct to the building structure, provides an abutment for placement of the duct.

Fiberglass and similar insulated ducts have generally been framed, in the past, by covering the ends of the duct with a generally rectangular frame of U-shaped metal. This U-shaped metal is typically fabricated on the job site by a sheet metal worker and provides no means for securing the duct to the channel, no guides for the plasterer or the sheetrocker, and requires drilling for the installation of the ventilation grille over the duct. Since there is no guide provided for the sheetrocker, occasionally the ventilation ducts are covered by this craftsman, which requires the ventilation tradesman to search for and open the duct before the grille can be installed.

SUMMARY

The duct-grille connection clip of the present invention generally includes a rectangular face with two parallel legs extending in the same direction perpendicular to the face. These legs are spaced apart sufficiently to snugly engage the fiberglass, or similar, lined duct and further may include barbs formed in one or both of the legs to anchor the duct to the clip. The clip, if desired to support the duct, is provided with holes for nailing, or otherwise suitably attaching, the clip to structural members, such as studs or plates. The face of the clip is perforated so that the grille may be attached to the clip, over the duct, by sheet metal screws, or other suitable fasteners, through chosen perforations. The clip also includes a ledge which serves as an abutment for the plasterer or sheetrocker so that this craftsman will have a guide to butt his work against.

Since the clips of the present invention may be prefabricated or mass-produced in appropriate thicknesses to match the various duct materials, the prior art practice of specifically fabricating a rectangular frame of channel shaped material on the job site is eliminated, with a consequent reduction in labor and material costs. Further, the present invention will provide a ledge or abutment to serve as a stop or spacer for the wall covering craftsmen to butt their work against. The incorporation of a perforated face on the clip provides a convenient means for attaching the grille to the end of the duct. The inclusion of barbs in the clip provides a means for attaching the duct to the clip without the use of additional non-integral fasteners.

Thus, it is an object of the present invention to provide a duct-grille connection clip which provides the foregoing advantages and features, while being capable of mass production and increasing the economy and efficiency of the ventilation trades.

It is a further object of the present invention to provide a clip which may be utilized to secure the duct to the structural members of the building, such as the studs and plates.

Other and further objects, features and advantages will be apparent from an examination of the following description of the presently preferred embodiment of the invention, given for the purpose of disclosure, taken in conjunction with the accompanying drawings.

BRIEF DESCRIPTION OF THE DRAWINGS

Like character references designate like parts throughout the several view of the drawings:

FIG. 1 is a perspective view of the termination of a duct showing several duct-grille connection clips of the present invention attached to the duct in operative position;

FIG. 2 is an end view of the clip.

DESCRIPTION OF THE PREFERRED EMBODIMENT

Referring now to FIG. 1, a perspective view of the termination of a ventilation duct 10 is shown. The duct 10 is lined with insulating material 12, such as fiberglass, or a similar thermal or accoustic insulating material, which provides some thickness to the duct 10. The outside of the duct 10 may be covered with aluminum foil, or in some instances, sheet metal. Adjacent to the duct 10 is a structural member 14, here shown as a vertical stud as in a building. Obviously, the structural member 14 may also be a horizontal plate at the ceiling or at the floor, as well as the beam in the ceiling. Attached to the four walls of the duct 10 is the duct-grille connection clip 16 of the present invention.

The clip 16 includes a generally rectangular face 18 which butts against the insulating material 12 forming the end of the duct 10. Extending from opposite edges of the face 18 are first and second legs 20 and 22, which are spaced apart the nominal thickness of each wall of the duct 10. The legs 20 and 22 are generally parallel and extend in the same direction perpendicular to the face 18. Forming an extension of the first leg 20 is a ledge or abutment 24 which extends in a direction opposite to leg 20 from the face 18 of the clip 16. Thus, it is seen that when the clip 16 is attached to the end of each wall of the duct 10, the face 16 is against the termination of the duct, while the ledge 24 projects therefrom. The ledge 24 is installed on the end of each wall of the duct, so that the ledge is adjacent the inner wall of the duct 10.

As seen in FIGS. 1 and 2, the first leg 20 includes a plurality of anchors, lances, or barbs 26 which extend inwardly toward the second leg 22. Although shown formed only in the first leg 20, similar barbs 26 may also be formed in the second leg 22 and extend inwardly toward the first leg 20. The barbs 26 are so formed as to slide over the insulating material 12 forming the walls of the duct 10 with relative ease, yet preventing the removal of the clip 16 when an attempt is made to slide the clip in the opposite direction. Thus, the barbs 26 serve to retain the clip on the duct or the duct in the clip, once it is inserted therein. The barb 26 provides an integral gripping means for attaching the clip 16 to the duct 10 wall. Under certain circumstances other gripping means might be employed, for example, an adhesive might also be used on the inner edges of legs 20 and 22 for the same purpose.

The second leg 22 may also include holes 28 therein through which appropriate fasteners 30, such as nails, may be utilized to attach the clip 16 to the structural member 14. In this instance the second leg is longer than the first leg so that the fastening technique will not displace the first leg. When this is done, the clip 16 which will be adjacent the structural member 14 to which the duct 10 is to be attached is installed first. This clip 16 is appropriately fastened to the structural member 14 with the face 18 of the clip 16 being even with the edge of the structural member 14. This is illustrated with the clip 16 in FIG. 1 on the left. Thereafter, the duct 10 is inserted into the clip 16 and the barbs 26 retain the duct in the clip 16. The face 18 thus serves as an abutment for the placement of the duct. One or more additional clips 16 may be pushed over the other walls of the duct 10 to provide an abutment for the wall covering material and for connection of the grill to the duct. The duct may be supported by means other than the clips, of course.

Thus, again as seen in FIG. 1, wall covering here shown as sheetrock 32 is illustrated below the duct 10 with the top edge 34 of the sheetrock covering the face 18 of the lower clip 16 and with the top edge abutting the ledge 24 of the lower clip. This illustrates the manner in which the clip 16 is utilized to provide an abutment for the wall covering. It further illustrates that the ledge 24 serves to outline, for the wall covering craftsman, the inner edge of the duct 10. The extension of the ledge from the face 18 should be no greater than the thickness of the wall covering material 32.

After the duct 10 is framed in with the wall covering material 32, and the various faces 18 of the clips 16 are covered, the grille 36 is applied to the duct. This may be done by attaching the grille to the clip 16 by appropriate fastening devices 38, such as screws. Although a hole may be drilled in the face 18 for each fastening device 38, it is preferred that the face be fabricated with a number of perforations 40 therein. These perforations 40 should be sized to engage the fastening member 38. Thus, in the preferred embodiment, the grille is held over the opening of the duct 10, and the fastening devices, such as sheet metal screws, are put through appropriate holes in the grille 36, through the wall covering material 32 to engage one of the perforations 40 in the face 18 of the clip 16. The fastening device 38 is then engaged with the clip 16, thereby retaining the grill on the duct.

As illustrated in FIG. 2, the entire clip 16 may be fabricated from an elongate piece of sheet metal by forming suitable bends therein, as well as perforating the face 18 and forming the barbs 26 in the legs. Similarly, the holes 28 for fastening the clips to the structural members 14 may be formed in the clip 16.

Thus, it is seen that the present invention has provided a duct-grille connection clip which is particularly useful in providing a means for attaching a grill to the end of an insulated duct, as well as providing an abutment for the wall covering material and a means for attaching the duct to a structural member. The present invention, therefore, is well adapted to carry out the objects and attain the ends and advantages mentioned, as well as others inherent therein. While a presently preferred embodiment of the invention has been given for the purpose of disclosure, numerous changes in the details of construction, and the combination, shape, size and arrangement of parts may be resorted to without departing from the spirit and scope of the invention as hereinafter claimed.

What is claimed is:

1. A ventilation duct clip for use in fastening a grille over a duct opening at the walls thereof including:
   a generally rectangular flat face,
   said face including perforations therethrough sized to hold fasteners inserted through the perforations,
   first and second parallel legs extending from opposite edges of said face,
   the distance between the first and second legs being approximately the thickness of the duct wall,
   the first and second legs extending perpendicular to the face and in the same direction therefrom,
   the second leg being longer than the first leg,
   the second leg having holes therein, whereby the second leg may be fastened to a structural member
   a ledge forming an extension of the first leg and extending in the opposite direction from the face as the first leg, and
   barbs formed in the first leg and extending toward the second leg to retain the clip on the duct wall.

* * * * *